United States Patent [19]

Woods

[11] 4,175,260

[45] Nov. 20, 1979

[54] RELAY DEVICE, METHODS OF ASSEMBLING AND MOUNTING, AND SYSTEM

[75] Inventor: Lee O. Woods, Morrison, Ill.

[73] Assignee: General Electric Company, Fort Wayne, Ind.

[21] Appl. No.: 809,054

[22] Filed: Jun. 22, 1977

[51] Int. Cl.² .......................... H01H 9/02; H02B 1/08

[52] U.S. Cl. ................................ 335/202; 339/206 R; 361/27

[58] Field of Search ........... 339/206 R, 206 P, 207 R, 339/208, 210 R; 361/27, 24, 25; 318/221 H, 221 E, 221 G; 335/2, 6, 202; 29/622

[56] References Cited

U.S. PATENT DOCUMENTS

| | | | |
|---|---|---|---|
| 2,589,893 | 3/1952 | Szaniszlo | 318/221 H |
| 2,641,746 | 6/1953 | Keller | 339/210 R |
| 3,130,284 | 4/1964 | Woods | 335/156 |
| 3,179,915 | 4/1965 | Klassen | 339/208 |
| 3,287,675 | 11/1966 | Woods | 335/202 |
| 3,354,454 | 11/1967 | Rueger | 340/381 |
| 3,629,803 | 12/1971 | Gluntz | 339/206 R |
| 3,921,117 | 11/1975 | Blaha | 361/27 |
| 4,037,316 | 3/1976 | Stoll | 361/27 |

*Primary Examiner*—Harold Broome
*Attorney, Agent, or Firm*—Joseph E. Papin

[57] ABSTRACT

A relay device adapted to be removably mounted in plug-on circuit relation with a pair of male terminals. The relay device has a pair of separable housing members releasably secured to each other with a pair of female terminals disposed so as to be generally retained therewithin, and a pair of means is provided in each of the housing members for the passage of the male terminal pairs into electrical contacting engagement with the female terminal pair. A pair of means on one of the housing members is associated with the passage means pair thereof for holding engagement with at least one of the female terminal pair and the male terminal pair so as to prevent the displacement of the one housing member from the female terminal pair in the event of at least a partial separation of the housing member pair when the female terminal pair is in the electrical contacting engagement with the male terminal pair.

A method of assembling a relay device and a method of mounting a relay device are also disclosed along with a system.

25 Claims, 12 Drawing Figures

RELAY DEVICE, METHODS OF ASSEMBLING AND MOUNTING, AND SYSTEM

FIELD OF THE INVENTION

This invention relates in general to electrical controls and in particular to a relay device, a method of assembling a relay device, a method of mounting a relay device in plug-on circuit relation with a pair of male terminals, and a system.

BACKGROUND OF THE INVENTION

In the past, relay devices have had a wide variety of applications with respect to various electrical energized apparatus. For example, an electric motor in a hermetic environment may, to avoid possible arcing within the hermetic environment, employ a relay device exteriorly of such environment with the relay device having normally open contacts in series with a start or auxiliary winding means of the electric motor and a relay coil in series with the run or main winding means of the electric motor. Thus, upon initial energization of the electric motor, a large current is drawn through the main winding means causing the relay device to effect the closure of the contacts in order to energize the auxiliary winding means generally simultaneously with the energization of the main winding means of the electric motor. As the motor speed increases generally to a preselected value, the current draw of the main winding means is decreased, and the relay device drops out, i.e. effects the reopening of its contacts, thereby to disable the auxiliary winding means or disconnect it from circuit relation with the main winding means. Of course, the continued energization of the main winding means thereafter operates the electric motor generally at its preselected or synchronous speed.

One relay device well suited to this type arrangement is illustrated in Woods U.S. Pat. No. 3,130,284. This patented relay device includes an insulating housing containing movable contacts and an axially movable sleeve which is mounted within the housing so as to be movable between two positions to actuate the contacts. A reciprocable magnetic armature is slidably mounted on the sleeve, and an electrical coil is disposed on the housing for magnetically energizing the armature. When a sufficient current is drawn through the coil, the armature is magnetically attracted against a spring force to move the sleeve and drive the contacts to their closed position. When the current drawn through the coil drops below a specified or drop-out level, the magnetic field of the coil is correspondingly reduced, and the spring force overcomes the reduced magnetic attraction of the coil with respect to the armature drawing it against the contacts to effect the re-opening of the contacts. This relay device is mechanically mounted to a cooperating supporting structure by a generally U-shaped bracket having a pair of depending legs for grippingly receiving the relay device, and an integral base is formed between such leg to receive screws or the like which threadedly engage such cooperating supporting structure.

A plug-on relay device is disclosed in a later Lee O. Woods U.S. Pat. No. 3,287,675 in which female terminals are disposed in a portion of the relay device housing for receiving in electrical contacting engagement male terminals when the relay device is plugged into such male terminals. In this arrangement, the male terminals are predeterminately mounted so as to be connected in circuit relation with a winding circuit of an electric motor which may be disposed in a hermetic environment. Still another plug-on type relay device is disclosed in the Thomas J. Kindelspire U.S. patent application Ser. No. 795,791 filed May 11, 1977.

SUMMARY OF THE INVENTION

Among the several objects of the present invention may be noted the provisions of an improved relay device, an improved method of assembling a relay device, an improved method of mounting a relay device, and an improved system; the provision of such relay device, methods and system which generally obviates exposure of "electrically hot" components in the event of at least a partial separation of a pair of housing members of the relay device in which the components are housed; and the provision of such relay device, methods and systems in which the components utilized therein are simplistic in design, easily assembled and economically manufactured. These as well as other objects and advantageous features of the present invention will be in part apparent and in part pointed out hereinafter.

In general, a relay device in one form of the invention is adapted to be removably mounted in plug-on circuit relation with a pair of male terminals of an electrically energized apparatus. Circuit means is provided for controlling the energization of the relay device and includes coil means adapted to be energized, means disposed in magnetic coupling relation with the coil means and operable generally for switching between circuit completing and interrupting positions, and a pair of female terminals connected with the coil means and the switching means and adapted for receiving in electrical contacting engagement the male terminal pair. Means for housing the circuit means includes a pair of separable housing members releasably secured to each other with the female terminal pair disposed so as to be generally retained therewithin. A pair of means in each of the housing member pair are aligned with each other and the female terminal pair for the passage of the male terminal pair into the electrical contacting engagement with the female terminal pair, respectively, and a pair of means on one of the housing members associated with the passage means pair thereof for holding engagement with at least one of the female terminal pair and the male terminal pair prevents the displacement of the one housing member from the female terminal pair in the event of at least a partial separation of the housing member pair when the female terminal pair is in the electrical contacting engagement with the male terminal pair.

Also in general, a method is provided in one form of the invention for mounting a receptacle means of a relay device in plug-on circuit relation with a pair of male terminals adapted to be electrically coupled with an electrically energized apparatus with the receptacle means including a pair of separable housing members releasably secured together so as to generally retain therebetween a pair of female terminal means with the female terminal pair being adapted for receiving in electrical contacting engagement the male terminal pair. In this method, the receptacle means of the relay device is plugged onto the male terminal pair of the apparatus in the plug-on circuit relation therewith, and the female terminal pair is inserted into the electrical contacting engagement with the male terminal pair. The displacement of one of the housing members from the female terminal pair is prevented in the event of at least a partial separation of the housing member pair, and thereby, the exposure of the female terminal pair is generally obviated when the female terminal pair and the male terminal pair are in the electrical contacting engagement with each other.

Further in general and also in one form of the invention, a method is provided for assembling a relay device having a receptacle means adapted to be mounted in plug-on circuit relation to a pair of male terminals. The receptacle means include a pair of separable housing members adapted to be releasably secured together so as to generally retain therebetween a pair of female terminals adapted to receive in electrical contacting engagement the male terminal pair. In this method, the female terminal pair is aligned with a pair of means in one of the housing members for accommodating the passage of the male terminal pair, and a pair of end portions of the female terminal pair are positioned at least adjacent a pair of means on the one housing member for bridging the passage accommodating means pair, respectively. The housing member pair are releasably secured together so as to generally effect the retention of the female terminal pair therebetween, and another pair of means in the other of the housing members for accommodating the passage of the male terminal pair is aligned with the first named passage accommodating means pair.

Still in general, a system in one form of the invention is provided for generally assuring the structural integrity of a relay device when it is mounted in plug-on circuit relation to a pair of male terminals electrically coupled with an electrically energized apparatus adapted to be energized from a power source. The system has circuit means associated with the relay device and adapted for connection in circuit relation with the power source for controlling the energization of the apparatus, and the circuit means includes a pair of female terminals for receiving in electrical contacting engagement the male terminal pair. Receptacle means on the relay device is adapted to be mounted in the plug-on circuit relation with the male terminal pair, and the receptacle means has a pair of separable housing members releasably secured together against displacement with the female terminal pair disposed so as to be generally enclosed therebetween for receiving in the electrical contacting engagement the male terminal pair when the receptacle means is mounted in the plug-on circuit relation therewith. One of the housing members has means respectively associated with at least one of the female terminal pair and the male terminal pair for preventing displacement of the one housing member from the female terminal pair in the event of at least a partial separation of the housing member pair from each other when the female terminal pair and the male terminal pair are in the electrical contacting engagement with each other.

BRIEF DESCRIPTION OF THE DRAWINGS

Corresponding reference characters indicate corresponding parts throughout the several views of the drawings.

The exemplifications set out herein illustrate preferred embodiments of the invention each in one form thereof, and such exemplifications are not to be construed as limiting the scope of the disclosure or the scope of the invention in any manner.

DETAILED DESCRIPTION OF THE PREFERRED EMBODIMENTS

Figure 1:
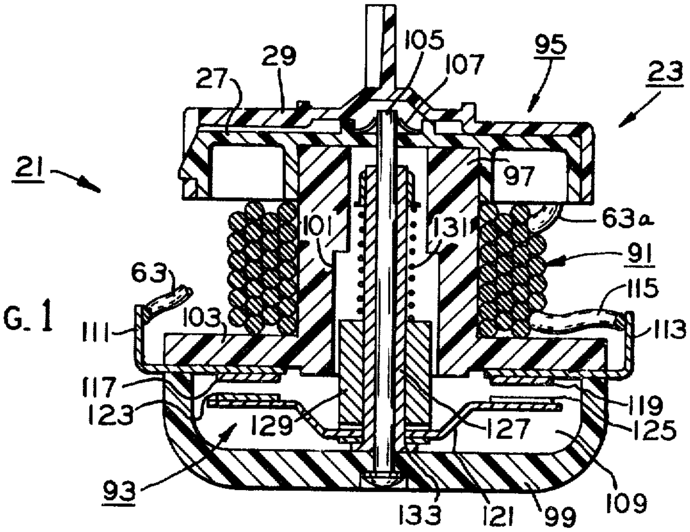
FIG. 1 is a sectional view illustrating a relay device in one form of the invention in cross section.
Figure 3:
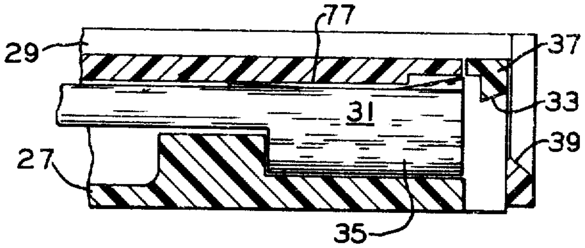
FIG. 3 is a sectional view taken along line 3—3 of FIG. 2.
Figure 2:
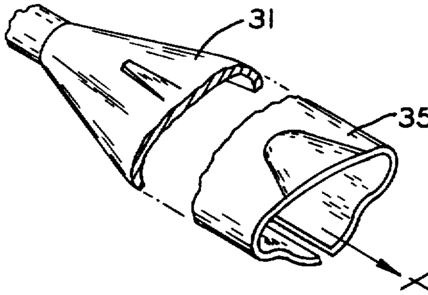
FIG. 2 is an exploded, partial perspective view of a receptacle means of the relay device of FIG. 1 teaching principles which may be utilized in a method of assembling the relay device in one form of the invention and also a method of mounting the relay device in one form of the invention.
Figure 2:
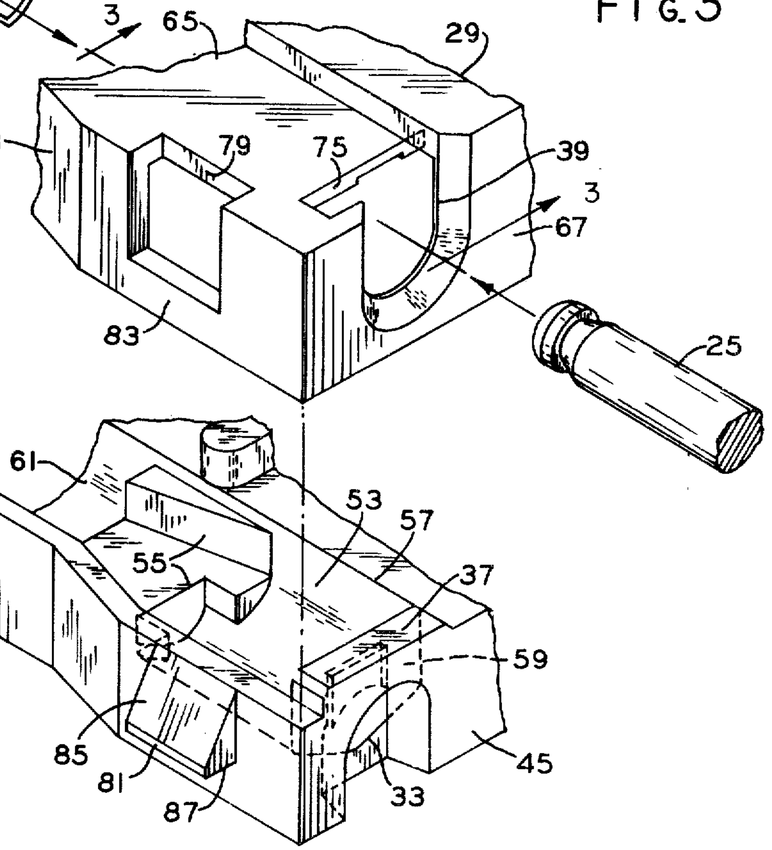
Figure 12:
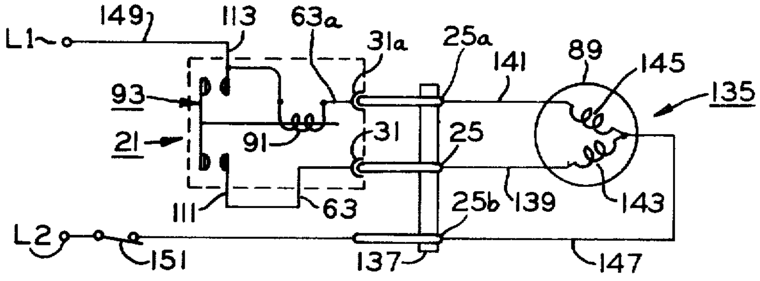
FIG. 12 is an exemplary schematic diagram of an electrical circuit in which the relay devices of this invention may be utilized.

Referring now to the drawings in general, a method is provided for assembling a relay device 21 having a receptacle means 23 adapted to be removably mounted in plug-on circuit relation with a pair of male terminals 25, 25*a* (FIGS. 1, 2 and 12). Receptacle means 23 includes a pair of separable housing members, such as a flange or flange portion 27 and a cover or cover portion 29, adapted to be releasably secured together, as discussed in greater detail hereinafter, so as to generally retain therewithin a pair of female terminals 31, 31*a* adapted to receive in electrical contacting engagement male terminal pair 25, 25*a*, respectively (FIGS. 2, 4–7 and 12). In this method, female terminal pair 31, 31*a* is aligned with a pair of means, such as openings or apertures 33, 33*a* or the like, in flange 27 for accommodating the passage of male terminal pair 25, 25*a*, and a pair of end portions 35, 35*a* of the female terminal pair is positioned or otherwise disposed at least adjacent a pair of means 37, 37*a* on flange 27 for bridging the passage means accommodating pair or openings 33, 33*a*. Flange 27 and cover 29 are then releasably secured together so as to generally effect the retention of female terminal pair 31, 31*a* therewithin, and another pair of means, such as openings or apertures 39, 39*a*, in the cover for accommodating the passage of male terminal pair 25, 25*a* are aligned with openings 33, 33*a* (FIGS. 2, 3 and 12).

More particularly and with specific reference to FIGS. 4–7, flange 27 and cover 29 are respectively molded or otherwise formed from a material having good electrical insulating characteristics, such as for instance a plastic or the like, and which is yieldable or resilient at least to a preselected degree. However, it is contemplated that only one of flange 27 and cover 29 may be formed of the aforementioned yieldable or deformable material within the scope of the invention so as to meet the objects and advantageous features thereof. Flange 27 has a pair of generally opposite or upper and lower surfaces 41, 43 interconnected or intersecting between a plurality of side surfaces 45, 47, 49, 51, and a pair of cavities 53, 53*a* are provided in the flange generally in spaced apart side-by-side relation intersecting with upper surface 41 and integrally interconnecting with openings 33, 33*a* which intersect with side surface 45. A pair of means, such as seats or abutments 55, 55*a*, for seating or seating engagement with female terminals 31, 31*a* are provided in cavities 53, 53*a*, and a pair of slots or groove portions 57, 57*a* extend from the seats in one direction toward side surface 45 so as to generally terminate adjacent openings 33, 33*a* in side surface 45. Another pair of means, such as seats or shoulders 59, 59*a*, for seating or locating engagement with end portions 35, 35*a* of female terminals 31, 31*a* are also provided in cavities 53, 53*a* extending between openings 33, 33*a* and slots 57, 57*a*. Thus, cavities 53, 53*a* comprise seats 55, 55*a*, slots 57, 57*a* and shoulders 59, 59*a* with such seats, slots and shoulders adapted to engage or seat confronting parts of female terminals 31, 31*a*, respectively. It may also be noted that bridging means pair 37, 37*a* or straps or bridging abutments are integrally formed on flange 27 at least adjacent side surface 45 thereof and extend generally across slots 57, 57*a* so as to form or define therewith at least a part of openings 33, 33*a* which extend through the flange between side surface 45 and shoulders 59, 59*a* thereof so as to communicate with cavities 57, 57*a*. While bridges 37, 37*a* are shown for purposes of disclosure as integrally of unitarily formed parts of flange 27, it is contemplated that such bridges may be interrupted so as to extend only part way across cavities 57, 57*a* within the scope of the invention so as to meet the objects and advantageous features thereof; however, such interrupted bridges must, of course, be capable of gripping engaging or at least abutment with at least one of male terminals 25, 25*a* and female terminals 31, 31*a*, as discussed in greater detail hereinafter. Lead guides, such as passage means or passages 61, 61*a*, which receive a pair of lead ends or parts 63, 63*a* of relay device 21 in electrical connection with female terminals 31, 31*a*, intersect or are associated with cavities 53, 53*a* extending therefrom in a direction generally opposite to that of slots 57, 57*a*, i.e., toward side surface 49, and the lead guides intersect with upper and lower surfaces 41, 43 and side surface 49 of flange 27.

Cover 29 has a cover wall 65 adapted generally for overlaying relation with upper surface 41 of flange 27, and the cover wall is integrally interconnected or intersects with a plurality of depending sidewalls 67, 69, 71, 73 on the cover. Openings 39, 39*a* are predeterminately positioned or located in sidewall 67 extending therethrough so as to generally align with female terminals 31, 31*a* seated in cavities 53, 53*a* of flange 27 and also align with apertures 33, 33*a* thereof when the flange and cover are disposed in their predetermined assembled positions, as discussed hereinafter. Cover wall 65 is provided with a pair of means, such as elongate openings or slots 75, 75*a*, extending therethrough and disposed in spaced relation adjacent sidewall 67 for receiving bridges 37, 37*a* of flange 27. Albeit not shown, it is contemplated that slots 75, 75*a* could be enclosed within cover wall 65, i.e. covered by integral parts of the cover wall extending over such slots so as to form them, within the scope of the invention so as to meet the objects and advantageous features thereof.

With female terminals 31, 31*a* and lead parts 63, 63*a* respectively positioned in cavities 53, 53*a* and passage means 61, 61*a* of cover 27, as previously mentioned, sidewalls 67–73 of cover 29 may be located or generally aligned so as to at least in part overlay in opposed confronting relation side surfaces 45–51 of flange 27. Of course, with sidewalls 67–73 so located with respect to side surfaces 45–51, cover wall 65 is spaced from upper surface 41 of flange 27 generally in overlaying relation therewith. At least one of flange 27 and cover 29 is moved with respect to the other thereof into their predetermined assembled position so as to dispose cover wall 65 at least closely adjacent upper surface 41 of the flange thereby to effect the closure of cavities 53, 53*a* and passage means 61, 61*a* capturing or enclosing female terminals 31, 31*a* and lead parts 63, 63*a* therein, respectively. Upon such movement of flange 17 and cover 27 to the predetermined assembled position thereof, bridges 37, 37*a* are received or positioned in their associated cover slots 75, 75*a*, and cover openings 39, 39*a* are disposed or located generally in coaxial alignment with flange apertures 33, 33*a* and also female terminals 31, 31*a* within cavities 53, 53*a* of the flange. Further, engagement means, such as abutments 77, 77*a*, on cover wall 65 may be disposed in abutting or locating engagement with confronting parts of female terminals 31, 31*a* so as to at least limit displacement movement of the female terminals with respect to seats 55, 55*a*, slots 57, 57*a* and shoulders 59, 59*a* of cavities 53, 53*a*. It may be noted that the displacement movement in cavities 53, 53*a* of female terminals 31, 31*a* is also at least limited by the engagement of the female terminals between their seats 55, 55*a* and shoulders 59, 59*a* of the cavities.

As flange 27 and cover 29 are being assembled in their predetermined assembled position, a plurality of recess or latching means 79, 79*a*, 79*b* provided in sidewalls 69, 71, 73 of the cover are respectively received over a plurality of detent or latching means 81, 81*a*, 81*b* integrally provided on side surfaces 51, 47, 49 of the flange so as to be releasably engaged or secured therewith, and with the detent means and recess means so cooperatively associated with each other, the cover and flange are releasably maintained against displacement from their predetermined assembled position. In other words when flange 27 and cover 29 are moved to their predetermined assembled positions, a part of a plurality of leading or distal edges or edge portions 83, 83*a*, 83*b* of sidewalls 73, 69, 71 adjacent recess means 79, 79*a*, 79*b* are engaged with a plurality of sloped surfaces 85, 85*a*, 85*b* of detent means 81, 81*a*, 81*b*, and in response to the wedging action of this engagement, sidewalls 73, 69, 71 yield or are spread slightly apart to accommodate the passage of the sidewall edges over the sloped surfaces. Of course, when sidewall edges 83, 83*a*, 83*b* pass over sloped surfaces 85, 85*a*, 85*b*, the resiliency of sidewalls 73, 69, 71 cause them to regain their original shape generally snapping the sidewall edges into releasable holding or securing engagement with a plurality of lower holding or latching shoulders or catches 87, 87*a*, 87*b* on detent means 81, 81*a*, 81*b* so that the detent means protrude into the recess means. Thus, recess means 79, 79*a*, 79*b* and detent means 81, 81*a*, 81*b* comprise means for releasable engagement with each other so as to maintain flange 27 and cover 29 in their predetermined assembled position. While recess means 79, 79*a*, 79*b* and detent means 81, 81*a*, 81*b* are illustrated herein as being integral with flange 27 and cover 29, it is contemplated that the recess means might be integral with the flange with the detent means being integral with the cover or that both the cover and the flange may be provided with each of the recess means and the detent means within the scope of the invention so as to meet the objects and advantageous features thereof. Further, while three cooperatively associated recess means 79, 79*a*, 79*b*, and detent means 81, 81*a*, 81*b* are illustrated herein for purposes of disclosure, it is also contemplated that a greater or lesser number of such cooperating associated recess means and detent means may be utilized within the scope of the invention so as to meet the objects and advantageous features thereof.

Referring again to the drawings in general, there is also disclosed in one form of the invention a method of mounting receptacle means 23 of relay device 21 in plug-on circuit relation with male terminals 25, 25*a* adapted to be electrically coupled with an electrically energized apparatus (not shown) including a prime mover, such as for instance a dynamoelectric machine 89, and the receptacle means includes a pair of separable housing members, such as flange 27 and cover 29, releasably secured together so as to generally retain or enclose therebetween female terminals 31, 31*a* with the female terminals being adapted for receiving in electrical contacting engagement the male terminals (FIGS. 2 and 12). In this method, receptacle means 23 of relay device 21 is plugged or otherwise mounted onto male terminals 25, 25*a* of dynamoelectric machine 89 in the plug-on circuit relation therewith so that female terminals 31, 31*a* receive or are inserted into the electrical contacting engagement with male terminals 25, 25*a* (FIGS. 2 and 12). Displacement of flange 27 from female terminals 31, 31*a* is prevented in the event of at least a partial separation of flange 27 and cover 29, and thereby, exposure of the female terminals is generally obviated when the female terminals and male terminals are in the electrical contacting engagement with each other.

More particularly, when relay device 21 is assembled together in the manner discussed hereinbefore, receptacle means 23 of the relay device may be mounted in the plug-on circuit relation with male terminals 25, 25*a* by initially positioning the aligned apertures 33, 33*a* and openings 39, 39*a* of flange 27 and cover 29 with the male terminals and then moving or passing the apertures and openings generally over or about the male terminals so as to insert or plug them into female terminals 31, 31*a* in the electrical contacting engagement therewith, respectively. With relay device 21 so mounted onto male terminals 25, 25*a*, there is always the possibility that flange 27 and cover 29 of the relay device may be subjected to an outside force to effect at least a partial separation from each other. For instance, a workman or electrician servicing apparatus 89 may inadvertantly brush or strike relay 21 in such a manner so as to effect the release of at least some of the detent means 81, 81*a*, 81*b* of flange 27 from their respective engagements with at least some of recess means 79, 79*a*, 79*b* of cover 29 and thereby cause at least a partial separation of the flange and cover. However, in the event of the at least partial separation of flange 27 and cover 29 from their assembled positions with each other, it may be noted that bridges 37, 37*a* may abut or grippingly engage male terminals 25, 25*a* for generally preventing the displacement of the flange away from female terminals 31, 31*a* so long as they are disposed in the electrical contacting engagement with the male terminals. In this manner, the engagement or abutment of bridges 37, 37*a* with male terminals 25, 25*a* in the event of the at least partial separation of flange 27 and cover 29 serves to prevent the displacement of the flange from female terminals 31, 31*a* and thereby obviate the exposure of the electrically hot female terminals when they are disposed in electrical contacting engagement with male terminals 25, 25*a*, respectively. It may also be noted that a part of openings 39, 39*a* may also be displaced into abutment or gripping engagement with male terminals 25, 25*a* in the event of the at least partial separation of flange 27 and cover 29, as previously mentioned, and such abutment of either bridges 37, 37*a* and/or portions of openings 39, 39*a* with male terminals 25, 25*a* may also serve to oppose the displacement movement or unplugging of female terminals 31, 31*a* from the male terminals.

Figure 4:
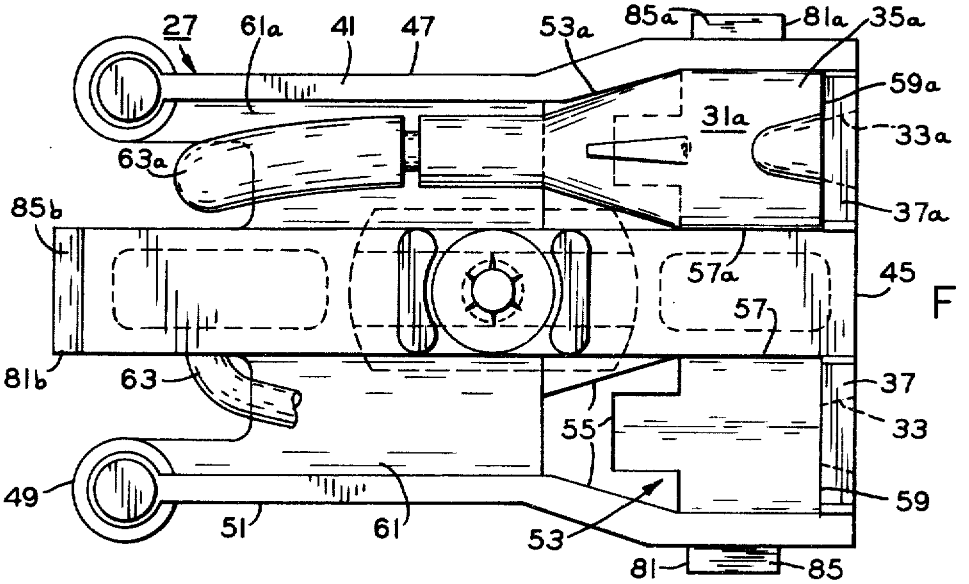
FIG. 4 is a partial top elevational view of the relay device of FIG. 1 illustrating a portion of its receptacle means with a cover thereof removed to illustrate the disposition of female terminals within cavities provided therefor in the receptacle means.
Figure 5:
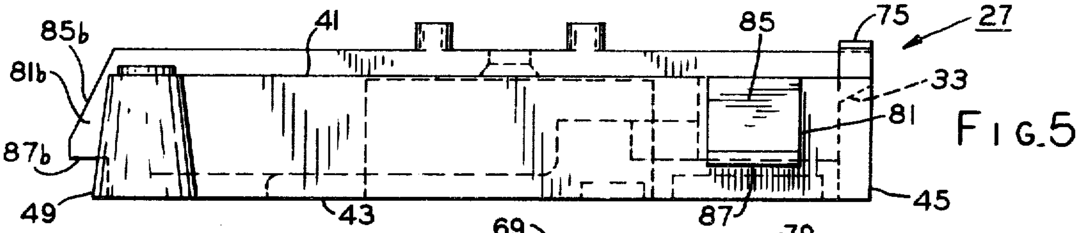
FIG. 5 is a side elevational view of the receptacle means portion of FIG. 4.
Figure 11:
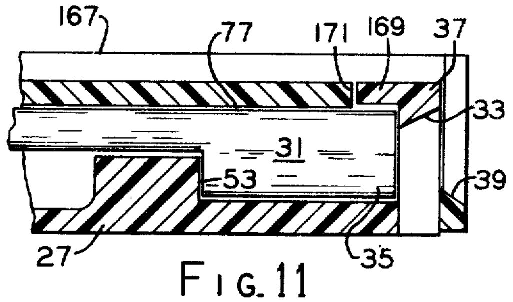
FIG. 11 is a partial sectional view illustrating the disposition of a female terminal in one of the cavities of the receptacle means of the another alternative relay device of FIG. 10.

Referring again to the drawings in general and recapitulating at least in part with respect to the foregoing, relay device 21 in one form of the invention is adapted to be removably mounted in plug-on circuit relation with male terminals 25, 25*a* of apparatus 89 (FIGS. 2 and 11). Relay device 21 is provided with coil means 91 adapted for electrical energization or excitement, and means, indicated generally at 93, is arranged in magnetic coupling relation with the coil means and operable generally for switching between circuit completing and interrupting positions (FIG. 1). Female terminals 31, 31*a* are connected in circuit relation with coil means 91 and switching means 93, and the female terminals are adapted for receiving in electrical contacting engagement male terminals 25, 25*a*, respectively (FIGS. 2, 3 and 12). Means, indicated generally at 95, is provided for housing coil means 91 and switching means 93, and the housing means includes a plug-on terminal receptacle, such as receptacle means 23, for the removable mounting in the plug-on circuit relation with male terminals 25, 25*a* with the receptacle means generally being comprised by flange 27 and cover 29 (FIG. 1). Flange 27 has cavities 53, 53*a* for respectively receiving in seated positions therein female terminals 31, 31*a*, and cover 29 is separable from the flange and releasably secured thereto so as to generally enclose the cavities with the female terminals in the seated positions thereof between the flange and the cover (FIGS. 2–4). First and second pairs of means, such as apertures 33, 33*a* and openings 39, 39*a*, are provided in flange 27 and cover 29 for respectively accommodating the passage of male terminals 25, 25*a* into the electrical contacting engagement with female terminals 31, 31*a* (FIGS. 2–7). A pair of means, such as bridges 37, 37*a*, are respectively provided on flange 27 for holding or gripping engagement with at least one of female terminals 31, 31*a* and male terminals 25, 25*a* so as to retain the flange portion against displacement from the female terminals in the event of at least a partial separation of cover 29 from the flange when receptacle means 23 is removably mounted in the plug-on circuit relation with the male terminals received in the electrical contacting engagement in the female terminals (FIGS. 2-5).

Figure 6:
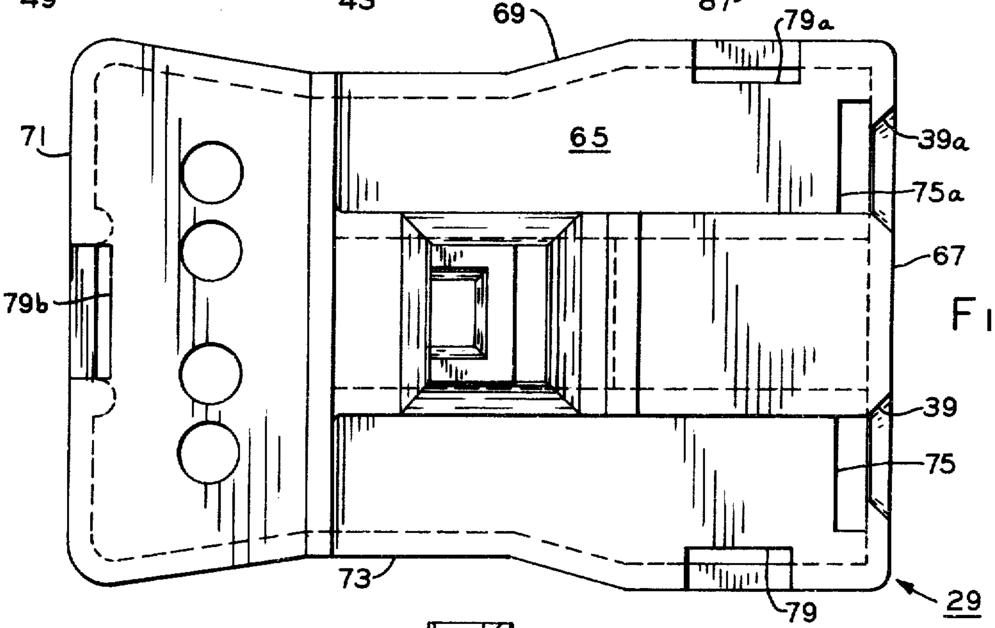
FIG. 6 is a plan view of the cover of the receptacle means.
Figure 7:
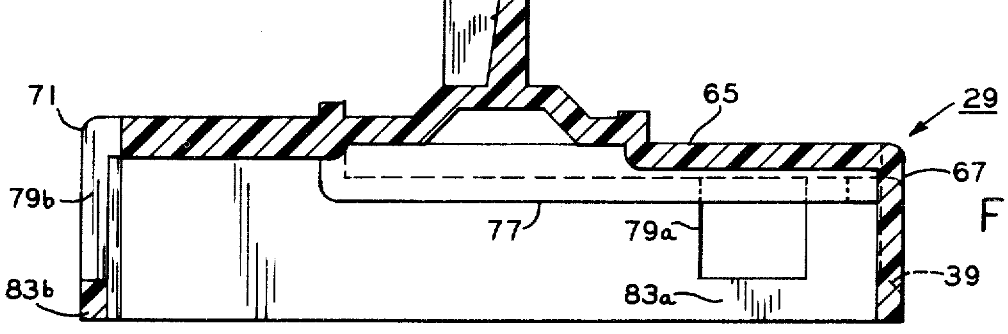
FIG. 7 is a side elevational view of the cover of FIG. 6.

More particularly and with specific reference to FIGS. 1, 4 and 6, housing means 95 has a plurality of housing portions including flange 27, cover 29, a bobbin 97 and a closure member 99, and the bobbin and closure member may also be molded or otherwise formed from a suitable dielectric material. Bobbin 97 has a bore 101 extending between the opposite ends thereof, and an integral base 103 extends generally radially of the bobbin adjacent one of the opposite ends thereof. A headed pin 105 extending through bobbin bore 101, closure member 99 and flange 27 retains the closure member seated on bobbin base 103 and retains the flange seated on the other end of bobbin 97, and a jam nut or washer 107 or the like is fixedly connected between the pin and the flange thereby to retain the flange and closure member against displacement from the bobbin. Thus, flange 27, bobbin 97 and closure member 99 enclose or define a switching means operating chamber 109 which includes bobbin bore 101, and a pair of terminals 111, 113 mounted between bobbin base 103 and closure member 99 have ends extending interiorly and exteriorly of the switch means chamber.

Coil means or relay coil 91 comprises a plurality of turns of dielectrically coated wire wound about bobbin 91 between base 103 thereof and flange 27, and one end or lead part **63*a* of the turn plurality is connected by suitable means, such as soldering or crimping for instance, with female terminal 31*a* while the other end or lead part 115 of the turn plurality is connected by suitable means, such as soldering or crimping for instance, to the exterior end of terminal 113. Lead 63 which is connected by suitable means, such as soldering or crimping or the like to female terminal 31, as previously mentioned, also has an end extending exteriorly of receptacle means 23 and connected by suitable means, such as soldering or the like, to the exterior end of terminal 111**.

Switching means 93 comprises a pair of contacts 117, 119 mounted to the interior end of terminals 111, 113 in chamber 109, and a movable contact member 121 carries another pair of contacts 123, 125 adapted for making and breaking engagement with contacts 117, 119. Contact member 121 is carried adjacent the lower end of a sleeve 127 slidably movable on pin 105, and an armature means 129 is slidably received about the sleeve and predeterminately positioned so as to be magnetically coupled with coil means 91 upon the energization thereof. Resilient means, such as a coil spring 131, is caged between armature means 129 and the upper end of sleeve 127. Thus, in the at-rest position of switching means 93, the compressive force of coil spring 131 acting on armature means 129 and also the weight of armature means 129 acting on contact member 121 urges it into abutment with a hub 133 on the lower end of sleeve 127 and also urges the hub into engagement with closure member 99.

After the component parts of relay device 21 are assembled together as described above, lead parts 63, **63*a* may be led into or laid in passage means 61, 61*a* of flange 27 so that female terminals 31, 31*a* are disposed in cavities 53, 53*a* in seating engagement therein between seats 55, 55*a* and shoulders 59, 59*a*, as shown in FIG. 4. With female terminals 31, 31*a* and leads 63, 63*a* so located in flange 27, cover 29 may be disposed generally about the flange in the assembled positions thereof wherein recess means 79, 79*a*, 79*b* of the cover and detent means 81, 81*a*, 81*b* of the flange are releasably engaged so as to maintain the cover and the flange in their predetermined assembled positions, as previously described hereinabove. Thus, when cover 29 is so releasably secured to flange 27 so as to complete the assembly of relay device 21, receptacle means 23 may be removably mounted in plug-on circuit relation with male terminals 25, 25*a* as illustrated in FIGS. 2, 3 and 12, by passing apertures 31, 31*a* and openings 39, 39*a* in the receptacle means over the male terminals and inserting female terminals 31, 31*a* captured within cavities 53, 53*a*** of the receptacle means into electrical contacting engagement with the male terminals.

Referring now to an exemplary circuit 135 shown in FIG. 12, male terminals 25, **25*a* and a third male terminal 25*c* may be mounted in a Fusite plug 137, if desired, on apparatus, such as a compressor for instance (not shown) having an hermetic environment in which electric motor 89 operates. Of course, male terminals 25, 25*a*, 25*b* may also be mounted in various other manners well known to the art on supporting structure (not shown) of electric motor 89 within the scope of the invention so as to meet the objects and advantageous features thereof. Male terminals 25, 25*a* are connected by leads 139, 141 with auxiliary or start winding means 143 and main or run winding means 145 of electric motor 89, and a return lead 147 interconnects the auxiliary and main winding means through male terminal 25*b* to a power terminal L2 which represents one side of a power source L1, L2. To complete the exemplary circuit, another lead 149 is connected between power terminal L1 and the external end of terminal 113 in relay device 21, and an on-off type switch 151 may be interconnected in lead 147 (or lead 149 if desired) for controlling the energization of electric motor 89** across power source L1, L2.

In the operation of relay device 21 in circuit 135 with the components thereof in their at-rest positions as shown in the drawings and described hereinabove, an operator may close on-off switch 151 to effect the energization of electric motor 89 across power source L1, L2. With on-off switch 151 closed, current may flow from power terminal L1 through lead 149, relay device terminal 113, coil means 91, female terminal **31*a*, male terminal 25*a*, lead 141 to main winding means 145 of electric motor 89 and therefrom through return lead 147, male terminal 25*b* and closed switch 151 to power terminal L2. Of course, upon such initial energization of of electric motor 89, there is a rather heavy current draw by its main winding means 145, and coil means 91 of relay device is responsive to such current draw to produce a magnetic field coupling with armature means 129 causing it to throw or rise (as best seen in FIG. 1) upwardly against the compressive force of spring 131. Of course, the force exerted by the rising movement of armature means 129 against spring 131 is transmitted therethrough to sleeve 127, and the sleeve rises on pin 105 generally conjointly with the rise of the armature means. In this manner, movable contact member 121 is moved upwardly with sleeve 127 until contacts 123, 125 on the movable contact member are moved into a circuit completing position in making engagement with contacts 117, 119. When contacts 123, 125 are made with contacts 117, 119, current flows from relay device terminal 113 through movable contact member 121 to terminal 111 and therefrom through lead 63**, female terminal 31, male terminal 25 and lead 139 to effect the energization or excitation of auxiliary winding means 143 generally simultaneously with the above described excitation of main winding means 145. As electric motor 89 is energized by both auxiliary and main winding means 143, 145 generally to a preselected or synchronous speed, the current draw is appreciably reduced effecting a corresponding reduction of the intensity of the magnetic field produced by coil means 91 in response to the reduced current draw. Therefore, when the current draw attains a preselected low or drop-out value for relay device 21, the magnetic coupling between coil means 91 and armature means 129 of the relay device is insufficient to hold the armature means against the compressive force of spring 131 acting thereon. Thus, the compressive force of spring 131 drives armature means 129 in a downward direction (as best seen in FIG. 1) so as to strike a hammer-like blow to movable contact member 121 causing it to move or break contacts 123, 125 from contacts 117, 119 in a very positive manner, and thereafter spring 131 drives the armature means, the movable contact member and sleeve 127 toward their at-rest or circuit interrupting positions, as previously described. Of course, upon the breaking of contacts 123, 125 from contacts 117, 119, the circuit means of relay device 21 is opened therethrough so as to effect the deexcitation or deenergization of auxiliary winding means 143 of electric motor 89, and the electric motor may be thereafter energized generally at its synchronous speed in response to the excitation or energization of main winding means 145 thereof. If a more detailed description of the operation of relay device 11 is desired reference may be had to the Lee O. Woods U.S. Pat. No. 3,130,284.

Referring again in general to the drawings and recapitulating at least in part with respect to the foregoing, it may be seen that a system is provided in one form of the invention for generally assuring the structural integrity of relay device 21 when it is mounted in plug-on circuit relation to male terminals 25, 25*a* electrically coupled with an electrically energized apparatus (not shown) including electric motor 89 (FIGS. 2, 3 and 12). The system includes circuit means associated with relay device 21 and adapted for connection in circuit relation with power source L1, L2 for controlling energization of electric motor 89 and having female terminals 31, 31*a* for receiving in electrical contacting engagement male terminals 25, 25*a* (FIG. 12). Receptacle means 23 on relay device 21 is adapted to be mounted in the plug-on circuit relation with male terminals 25, 25*a*, and the receptacle means includes separable housing members, such as flange 27 and cover 29, releasably secured together against displacement with female terminals 31, 31*a* disposed so as to be generally enclosed therebetween for receiving in the electrical contacting engagement male terminals 25, 25*a* when the receptacle means is mounted in the plug-on circuit relation therewith (FIGS. 2 and 12). Flange 27 includes means, such as bridges 37, 37*a*, respectively associated with at least one of female terminals 31, 31*a* and male terminals 25, 25*a* for preventing displacement of the flange from the female terminals in the event of at least a partial separation of the flange and cover 29 from each other when the female terminals and the male terminals are in the electrical contacting engagement with each other.

Figure 8:
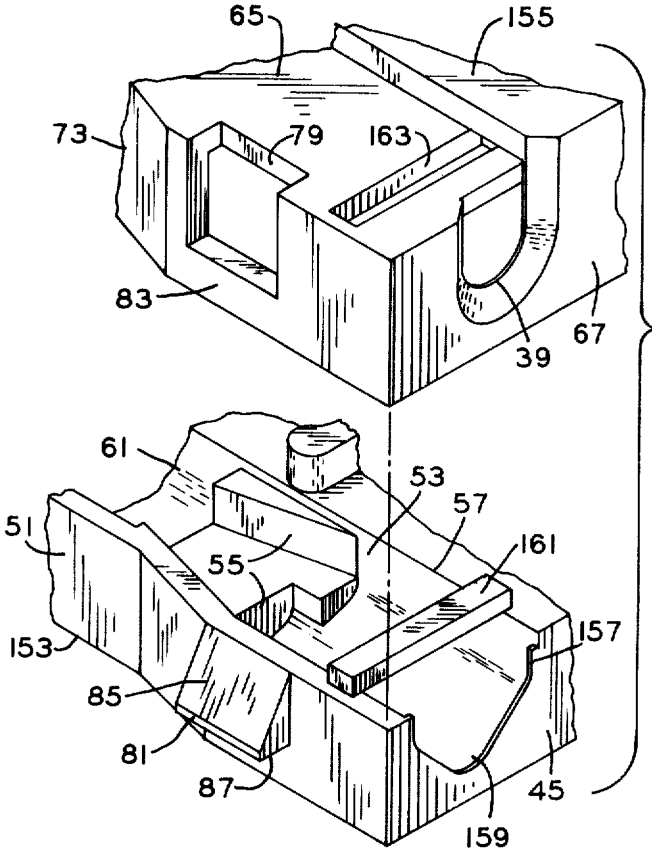
FIG. 8 is an exploded, partial perspective view of a receptacle means of an alternative relay device in one form of the invention and illustrating principles which may be utilized in a method of assembling and a method of mounting a relay device, respectively.
Figure 9:
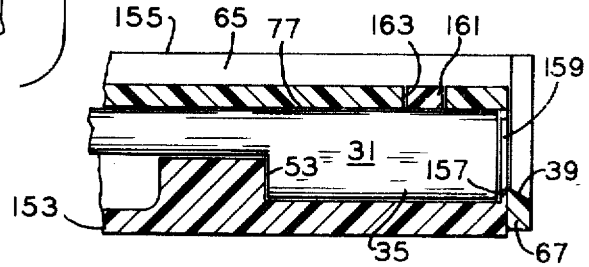
FIG. 9 is a partial sectional view illustrating the disposition of a female terminal in one of the cavities of the receptacle means of the alternative relay device shown in FIG. 8.

In FIGS. 8 and 9, there is shown in one form of the invention an alternative flange 153 and cover 155 for relay device 21 having generally the same component parts and functioning generally in the same manner as the previously discussed flange 27 and cover 29 with the exceptions discussed hereinafter; however, while flange 153 and cover 155 may be utilized on the relay device so as to meet the objects and advantageous features set out hereinbefore, other objects and advantageous features indigenous to the relay device utilizing flange 153 and cover 155 will be in part pointed out and in part apparent in the following discussion.

For the sake of brevity only a portion of flange 153 and cover 155 is shown in FIGS. 8 and 9, and although not shown, similar parts or portions of the flange and cover will be designated by the letter "a" when discussed in conjunction with those portions of the flange and cover shown generally in the same manner set forth in the previous discussion of FIGS. 1–8 with respect to relay device 21. Flange 153 is provided with a pair of shoulders 157, 157*a* disposed between cavities 53, 53*a* and side surface 45 for abutting or positioning engagement with end portions 35, 35*a* of female terminals 31, 31*a* disposed in the cavities, as previously described, and a pair of openings 159, 159*a* are provided in the flange between the shoulders and the side surface so as to communicate with the cavities. A pair of means, such as straps or bridges 161, 161*a*, for holding, gripping or bridging engagement with end portions 35, 35*a* of female terminals 31, 31*a* located in cavities 53, 53*a* are integrally formed with the flange in spaced relation with shoulders 157, 157*a* so as to span across the cavities, respectively. Thus, bridging means or bridges 161, 161*a* are disposed in holding or gripping engagement with end portions 135, 135*a* of female terminals 31, 31*a* when they are positioned or located in an assembled position within cavities 53, 53*a* thereby to prevent displacement between flange 153 and female terminals 31, 31*a* in the event of at least a partial separation of cover 155 from its assembled position on the flange. When cover 155 is disposed in the assembled position with flange 153, recess means 79, 79*a*, 79*b* of the cover are releasably engaged with detent means 81, 81*a*, 81*b* of the flange, and bridges 161, 161*a* are received in slots 163, 163*a* provided therefor through cover wall 65 of cover 155. Further, openings 159, 159*a* of flange 155 are aligned with openings 39, 39*a* of cover 157 so as to accommodate the passage therethrough of male terminals 31, 31*a* disposed in cavities 53, 53*a*, as previously discussed, when relay 21 is mounted in the plug-on circuit relation with the male terminals.

Figure 10:
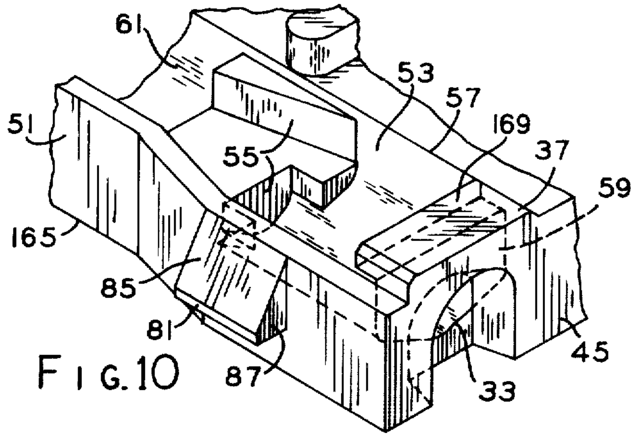
FIG. 10 is a partial perspective view illustrating a portion of a receptacle means of another alternative relay device in one form of the invention and teaching principles which may be utilized in a method of assembling and a method of mounting the another alternative relay device, respectively.

Referring now to FIGS. 10 and 11, there is also shown in the form of the invention another alternative flange 165 and cover 167 for relay device 21 having generally the same component parts and functioning generally in the same manner as the previously discussed flange 27 and cover 29 with the exceptions discussed hereinafter; however, while flange 165 and cover 167 may be utilized in the relay device so as to meet the objects and advantageous features set out hereinbefore, other objects indigenous to the relay device utilizing flange 165 and cover 167 will be in part pointed out and in part apparent in the following discussion.

Again, for the sake of brevity, only a portion of flange 165 and cover 167 are shown in FIGS. 10 and 11, and although not shown, similar parts or portions of the flange and cover will be discussed in conjunction with those portions of the flange and cover shown generally in the same manner set forth in the previous discussion of FIGS. 1–8 with respect to relay 21. Bridges 37, 37*a* of flange 165 are provided with a pair of integrally formed means, such as lips or extensions 169, 169*a*, for holding, gripping or abutting engagement with end portions 35, 35*a* of female terminals 31, 31*a* disposed in cavities 53, 53*a* of female terminals 31, 31*a* disposed in cavities 53, 53*a*. Thus, when cover 167 is in its assembled position on flange 165, recess means 79, 79*a*, 79*b* of the cover are releasably engaged with detent means 81, 81*a*, 81*b* of the flange, and lips 169, 169*a* engaged with female terminals 31, 31*a* so as to prevent displacement between the female terminals and the flange in the event of at least a partial separation of the cover from the flange. Further, lips 169, 169*a* and bridges 37, 37*a* are received in a pair of slots 171, 171*a* provided therefor in cover wall 65 of cover 167, and openings 33, 33*a* of the flange are aligned with apertures 39, 39*a* of the cover when the cover and flange are disposed in their assembled positions so as to accommodate the passage of male terminals 25, 25*a* into electrical contacting engagement with female terminals 31, 31*a* disposed in cavities 53, 53*a* when relay 21 is removably mounted in the plug-on circuit relation with the male terminals, as previously discussed. Thus, in the event of an at least partial separation of cover 167 from flange 165, lips 169, 169*a* of bridges 37, 37*a* may engage female terminals 31, 31*a* so as to prevent displacement between the female terminals and the flange and/or bridges 37, 37*a* may engage male terminals 25, 25*a* so as to prevent the displacement of the flange from the female terminal when they are disposed in electrical contacting engagement with the male terminals.

From the foregoing, it is now apparent that a novel relay device, a novel method of assembling a relay device, a novel method of mounting a relay device, and a novel system have been presented meeting the objects and advantageous features set out hereinabove, as well as others, and that modifications as to the precise arrangements, configurations, details and connections of the relay device and systems, as well as the steps of the methods, may be made by those having ordinary skill in the art without departing from the spirit of the invention or the scope thereof as set out by the claims which follow.

What I claim as new and desire to secure by Letters Patent of the United States is:

1. A relay device adapted to be removably mounted in plug-on circuit relation with a pair of male terminals of an electrically energized apparatus, the relay device comprising:

a housing having receptacle means adjacent an end thereof for the releasable mounting in the plug-on circuit relation with the male terminals;

coil means associated with said housing and adapted for electrical energization;

switch means in said housing including a first pair of contact means, a second pair of contact means movable between making and breaking positions with respect to said first contact means pair, and armature means disposed in magnetic coupling relation with said coil means and associated with said second contact means pair for moving them from one of the making and breaking positions to the other thereof upon the energization of said coil means;

a pair of female terminals for respectively receiving in electrical contacting engagement the male terminals;

a first lead associated with said coil means and electrically connected with one of said female terminals;

a second lead electrically connected between the other of said female terminals and one of said contact means of said first contact means pair;

said receptacle means including a flange portion and a cover portion separable therefrom and arranged so as to be releasably engaged with said flange portion in a predetermined assembled position;

said flange portion including a pair of opposite surfaces interconnected between a plurality of side surfaces, a pair of cavities in one of said opposite surfaces and in which said female terminal pair is respectively seated, a pair of passage means in said one opposite surface and associated with said cavity pair for receiving said first and second leads, respectively, a first pair of openings respectively intersecting with one of said side surfaces of said side surface plurality and connected with said cavity pair for accommodating the passage of the male terminal pair into the electrical contacting engagement with said female terminal pair when said receptacle means is removably mounted in the plug-on circuit relation with the male terminal pair, a pair of bridging means disposed at least closely adjacent said one side surface so as to extend generally across one of said first opening pair and said cavity pair and adapted for engagement with at least one of said female terminal pair and the male terminal pair so as to generally prevent the displacement of said flange from said female terminal pair in the event of at least a partial separation of said flange portion and said cover portion when said female terminal pair is disposed in the electrical contacting engagement with the male terminal pair; and said cover portion including a cover wall interconnected between a plurality of sidewalls depending therefrom, said cover wall being disposed generally in overlaying relation with said one opposite surface of said flange portion and at least some of said sidewalls of said sidewall plurality being disposed at least in part in opposed confronting relation with at least some of said side surfaces of said side surface plurality on said flange portion so as to generally capture said female terminal pair in said cavity pair with at least part of said first and second leads enclosed within said passage means pair when said cover portion is releasably engaged in the predetermined assembled position with said flange portion, and a second pair of openings in one of said sidewalls of said sidewall plurality disposed in the overlaying relation with said one side surface of said flange portion when said cover portion and said flange portion are releasably engaged with each other in the predetermined assembled position and arranged generally in alignment with said first opening pair for accommodating the passage of the male terminal pair into the electrical contacting engagement with said female terminal pair when said receptacle means is removably mounted in the plug-on circuit relation with the male terminal pair.

2. A relay device adapted to be removably mounted in plug-on circuit relation with a pair of male terminals of an electrically energized apparatus, the relay device comprising;

coil means adapted for electrical energization;

means arranged in magnetic coupling relation with said coil means and operable generally for switching between circuit completing and interrupting positions;

a pair of female terminals connected in circuit relation with said coil means and said switching means and adapted for receiving in electrical contacting engagement the male terminal pair, respectively; and means for housing said coil means and said switching means and including receptacle means for the removable mounting in the plug-on circuit relation with the male terminal pair, said receptacle means including a flange portion having a pair of cavities therein for respectively receiving in seated positions therein said female terminal pair, a cover portion separable from said flange portion and releasably secured thereto so as to generally enclose said cavity pair with said female terminal pair in the seated positions thereof between said flange portion and said cover portion, first and second pairs of openings in said flange portion and said cover portion for accommodating the passage of the male terminal pair into the electrical contacting engagement with the female terminal pair, respectively, and a pair of means on said flange portion adapted for holding engagement with at least one of said female terminal pair and the male terminal pair so as to retain said flange portion generally against displacement from said female terminal pair in the event of at least a partial separation of said cover portion from said flange portion when said receptacle means is removably mounted in the plug-on circuit relation with the male terminal pair received in the electrical contacting engagement in said female terminal pair.

3. A relay device as set forth in claim 2 wherein said holding engagement means includes a pair of means for respective abutment with a portion of said female terminal pair in the seated positions thereof in said cavity pair so as to generally prevent the displacement of said flange portion from said female terminal pair in the event of the at least partial separation of said cover portion from said flange portion.

4. A relay device as set forth in claim 2 wherein said holding engagement means comprises a pair of bridges extending at least in part across said first opening pair and adapted to engage one of said female terminal pair and the male terminal pair so as to retain said flange portion generally against the displacement from said female terminal pair in the event of the at least partial separation of said cover portion and said flange portion when said receptacle means is removably mounted in the plug-on circuit relation with the male terminal pair received in the electrical contacting engagement with said female terminal pair.

5. A relay device as set forth in claim 2 wherein said holding engagement means comprises a pair of bridges extending at least in part across said cavity pair for abutment with a portion of said female terminal pair in the seated positions thereof in said cavity pair so as to generally prevent the displacement of said flange portion from said female terminal pair in the event of the at least partial separation of said cover portion from said flange portion.

6. A relay device as set forth in claim 2 wherein said cover portion includes a pair of means for abutment with said female terminal pair so as to capture said female terminal pair in the seated positions thereof in said cavity pair when said cover portion is releasably secured to said flange portion.

7. A relay device adapted to be removably mounted in plug-on circuit relation with a pair of male terminals of an electrically energized apparatus, the relay device comprising:

circuit means for controlling the energization of the relay device and including coil means adapted for energization, means disposed in magnetic coupling relation with said coil means and operable generally for switching between circuit completing and interrupting positions, and a pair of female terminals connected with said coil means and said switching means and adapted for receiving in electrical contacting engagement the male terminal pair; and means for housing said circuit means and including at least a pair of separable housing members releasably secured to each other with said female terminal pair disposed so as to be generally captured therebetween, a pair of means in each of said housing member pair and generally aligned with each other and said female terminal pair for accommodating the passage of the male terminal pair into the electrical contacting engagement with said female terminal pair, and a pair of means on one of said housing members associated with said passage means pair thereof and adapted for holding engagement with at least one of said female terminal pair and the male terminal pair so as to generally prevent the displacement of said one housing member from said female terminal pair in the event of at least a partial separation of said housing member pair when female terminal pair is in the electrical contacting engagement with the male terminal pair.

8. A relay device as set forth in claim 7 wherein the other of said housing member includes a pair of means for respectively receiving said holding engagement means when said housing member pair are releasably secured to each other.

9. In a relay device having a pair of separable housing members releasably secured to each other, a pair of seating cavities in one of the housing members, a pair of female terminals disposed between the housing members and seated in the cavity pair, and a pair of openings in each of the housing member pair generally aligned with each other and the female terminal pair; the improvement comprising a pair of means on said housing member and extending at least in part across said cavity pair for abutment with said female terminal pair so as to generally retain said female terminal pair against displacement from said cavity pair terminal pair in the event of at least a partial separation of said housing members.

10. The relay device as set forth in claim 9 further comprising a pair of means in the other of said housing members for respectively receiving said abutment means when said housing member pair are releasably secured to each other.

11. A method of assembling a relay device having receptacle means adapted to be removably mounted in plug-on circuit relation with a pair of male terminals, the receptacle means including a pair of separable housing members adapted to be releasably secured through so as to generally retain therebetween a pair of female terminals adapted to receive in electrical contacting engagement the male terminal pair, the method comprising the steps of:

(a) aligning the female terminal pair with a pair of means in one of the housing members for accommodating the passage of the male terminal pair and positioning a pair of end portions of the female terminal pair at least adjacent the passage accommodating means and a pair of means on the one housing member for bridging the passage accommodating means pair, respectively; and (b) releasably securing the housing member pair together so as to generally effect the retention of the female terminal pair therebetween and aligning another pair of means in the other of the housing members for accommodating the passage of the male terminal pair with the first named passage accommodating means pair.

12. The method as set forth in claim 11 wherein the aligning and positioning step includes locating the female terminal pair in a pair of cavities provided therefor in the one housing member so as to effect the aligning of the female terminal pair with the first named passage accommodating means pair.

13. The method as set forth in claim 11 wherein the releasably securing and aligning step includes inserting at least a pair of the bridging means into a pair of means in the other housing member for respectively receiving the at least part of the bridging means.

14. A method of assembling a relay device having receptacle means adapted to be mounted in plug-on circuit relation to a pair of male terminals, the receptacle means including a pair of separable housing members adapted to be releasably secured together so as to generally enclose a pair of female terminal means therebetween with the female terminal pair being adapted to receive in electrical contacting engagement the male terminal pair, the method comprising the steps of:

(a) disposing the female terminal pair in one of the housing members and inserting at least a pair of the female terminal pair beneath a pair of means on the one housing member for holding engagement therewith, respectively; and (b) releasably securing the housing member pair together so as to generally enclose the female terminal member therebetween with the holding engagement means preventing displacement of the one housing member from the female terminal pair in the event of at least a partial separation of the housing member pair subsequent the releasable securing together thereof.

15. A method of mounting receptacle means of a relay device in plug-on circuit relation with a pair of male terminals adapted to be electrically coupled with an electrically energized apparatus with the receptacle means including a pair of separable housing members releasably secured together so as to generally retain therebetween a pair of female terminals with the female terminal pair being adapted for receiving in electrical contacting engagement the male terminal pair, the method comprising the steps of:

(a) plugging the receptacle means of the relay device onto the male terminal pair of the apparatus in the plug-on circuit relation therewith and inserting the female terminal pair into the electrical contacting engagement with the male terminal pair; and (b) preventing the displacement of one of the housing members from the female terminal pair in the event of at least a partial separation of the housing member pair and thereby generally obviating exposure of the female terminal pair when the female terminal pair and the male terminal pair are in the electrical contacting engagement with each other.

16. The method as set forth in claim 15 wherein the preventing and obviating step includes engaging a pair of means on the one housing member with the male terminal means in the event of the at least partial separation the housing member pair when the female terminal pair and the male terminal pair are in the electrical contacting engagement with each other.

17. The method as set forth in claim 15 wherein the plugging and inserting step includes passing a first and second pair of openings in the housing members and generally aligned with the female terminal pair about the male terminal pair to effect the insertion of the female terminal pair and the male terminal pair into the electrical contacting engagement with each other, respectively.

18. The method as set forth in claim 17 wherein the preventing and obviating step includes engaging with the male terminal pair a pair of means on the one housing member for bridging at least in part the first opening pair in the event of the at least partial separation of the housing member pair.

19. The method as set forth in claim 15 wherein the preventing and obviating step includes abutting a pair of means on said one housing with said female terminal pair in displacement preventing engagement therewith.

20. A system for generally assuring the structural integrity of a relay device when it is mounted in plug-on circuit relation to a pair of male terminals electrically coupled with an electrically energized apparatus adapted to be energized from a power source, the system comprising circuit means associated with said relay device and adapted for connection in circuit relation with the power source for controlling the energization of the apparatus, said circuit means including a pair of female terminals for receiving in electrical contacting engagement said male terminal pair; receptacle means on said relay device and adapted to be mounted in the plug-on circuit relation with said male terminal pair, said receptacle means including a pair of separable housing members releasably secured together against displacement with said female terminal pair disposed so as to be generally enclosed therebetween for receiving in the electrical contacting engagement said male terminal pair upon the mounting of said receptacle means in the plug-on circuit relation therewith, one of said housing members including means respectively associated with at least one of said female terminal pair and said male terminal pair for preventing displacement of said one housing member from said female terminal pair in the event of at least a partial separation of said housing member pair from each other when said female terminal pair and said male terminal pair are in the electrical contacting engagement with each other.

21. The relay device as set forth in claim 9 wherein said abutment means pair respectively define a part of the opening pair in the one housing member.

22. The relay device as set forth in claim 9 wherein the other of the housing members includes a pair of means for respective abutment with the female terminal pair so as to maintain the female terminal pair seated in the cavity pair when the housing members are releasably secured to each other.

23. The relay device as set forth in claim 9 further comprising means on the housing members for releasable engagement with each other to effect the releasable securing engagement of the housing members, respectively.

24. A relay device as set forth in claim 2 further comprising means on said flange portion and said cover portion respectively and arranged for engagement with each other so as to releasably secure said flange portion and said cover portion together.

25. A relay device as set forth in claim 7 wherein said housing means further includes means respectively associated with said housing member pair and adapted for abutting engagement so as to effect the releasable securing of the housing member pair to each other.

* * * * *